United States Patent [19]

Zen

[11] Patent Number: 4,805,832
[45] Date of Patent: Feb. 21, 1989

[54] FOUNTAIN-TYPE SOLDERING APPARATUS

[75] Inventor: Mitsuo Zen, Souka, Japan

[73] Assignee: Senju Metal Industry Co., Ltd., Tokyo, Japan

[21] Appl. No.: 84,767

[22] Filed: Aug. 13, 1987

[30] Foreign Application Priority Data

Apr. 13, 1986 [JP] Japan .............................. 61-190284
Aug. 23, 1987 [JP] Japan .............................. 62-100591

[51] Int. Cl.4 .............................................. B23K 1/06
[52] U.S. Cl. ...................................... 228/260; 228/37; 228/262; 228/1.1
[58] Field of Search ................ 228/37, 260, 262, 56.1, 228/56.2, 1.1, 180.1

[56] References Cited

U.S. PATENT DOCUMENTS

| | | | |
|---|---|---|---|
| 3,303,983 | 2/1967 | Patrick et al. | 228/180.1 |
| 3,795,358 | 3/1974 | Sarnacki et al. | 228/56.2 |
| 4,101,066 | 7/1978 | Corsaro et al. | 228/180.1 |
| 4,530,457 | 7/1985 | Down | 228/180.1 |
| 4,684,056 | 8/1987 | Deambrosio | 228/180.1 |

Primary Examiner—Nicholas P. Godici
Assistant Examiner—Karen Skillman
Attorney, Agent, or Firm—Sughrue, Mion, Zinn, Macpeak & Seas

[57] ABSTRACT

A fountain-type soldering apparatus is disclosed, which comprises:
  an outer tank which contains molten solder;
  a nozzle which is immersed in said molten solder in said outer tank, said nozzle having a longitudinally-extending discharge port which extends above the surface of said molten solder and having two end panels at the opposite ends of said nozzle which form the end walls thereof, each of said end panels having a through opening formed therein;
  a moving body which is disposed in said discharge port and which extends for the length thereof, the opposite ends of said moving body passing loosely through said through openings in said end plates; and
  support means for supporting each end of said moving body such that said moving body can oscillate vertically therein.

10 Claims, 3 Drawing Sheets

FOUNTAIN-TYPE SOLDERING APPARATUS

This invention relates to a fountain-type soldering apparatus for the soldering of printed circuit boards, and particularly for the soldering of printed circuit boards having semiconductor chips mounted thereon.

BACKGROUND OF THE INVENTION

The so-called fountain-type soldering method is one in which a stream of molten solder is caused to gush upwards from a nozzle in the form of a fountain, and portions of a printed circuit board which require soldering are immersed in the stream which rises above the nozzle. By forming a large number of choppy waves in the stream of molten solder, the solder can be made to penetrate to all portions of the semiconductor chip and poorly soldered connections can be prevented.

As it is important to form choppy waves in the stream of molten solder, a soldering bath for use in this method is equipped with a suitable wave-making device.

There have been many different proposals concerning the structure of a soldering bath for the fountain-type soldering method and of a wave-making device for use in such a soldering bath. However, in all of these proposals, the wave-making device has a sliding or rotating member which is immersed in molten solder, and as a result the wave-making device is subject to frequent breakdowns. Furthermore, as it is necessary to provide drive mechanism for the wave-making device on the outside of the solder bath, the costs of the bath and the wave-making device are extremely high. Moreover, conventional wave-making devices are unable to produce a uniform stream of molten solder having sufficiently choppy waves in the surface thereof, and therefore high-quality soldering can not be performed.

SUMMARY OF THE INVENTION

The present inventors performed various investigations aimed at obtaining a fountain-type soldering apparatus which could produce choppy waves in a stream of molten solder using a simple and inexpensive mechanism. In the course of these investigations, the present inventors conceived of installing a rod-shaped moving body within the discharge port of a discharge nozzle which is immersed within a molten soldering bath, the ends of the rod-shaped moving body being supported by springs. Such a soldering bath was disclosed by the present inventors in Japanese Utility Model Registration application No. 60-193624, filed on Dec. 18, 1985, and published as No. 62-101660 on June 29, 1987.

By disposing a rod-shaped moving body having both ends supported by springs within the discharge port so that it is immersed in solder, and elastically supporting it by springs, the rod-shaped moving body moves back and forth in the vertical and horizontal directions as molten solder gushes from the discharge port. This motion of the rod-shaped moving body produces choppy waves in the stream of molten solder.

While a wave-making device in the form of a rod-shaped moving body produces excellent waves and is inexpensive to manufacture, as a result of further experiments, it was found that as the springs which support the rod-shaped moving body are immersed in molten solder, the springs produce nonuniformity in the stream of molten solder. Furthermore, molten solder causes the deterioration of the springs, decreasing their life-span and producing breakdowns in the wave-making device.

Accordingly, the object of the present invention is to provide an inexpensive and durable fountain-type soldering apparatus which can be used to perform high-quality soldering of semiconductor chips to printed circuit boards.

Another object of the present invention is to provide a fountain-type soldering apparatus which can produce a more uniform stream of molten solder having choppy waves therein.

The present inventors performed numerous further investigations in order to attain the above-described objects. As a result, it was found that by improving the support mechanism for a moving body which is disposed in a gushing stream soldering bath, the above-described problems can be solved, and the present invention was completed.

The present invention is a fountain-type soldering apparatus which comprises:

an outer tank which contains molten solder;

a nozzle which is immersed in said molten solder in said outer tank, said nozzle having a longitudinally-extending discharge port which extends above the surface of said molten solder and having two end panels at the opposite ends of said nozzle which form the end walls thereof, each of said end panels having a through opening formed therein;

a moving body which is disposed in said discharge port and which extends for the length thereof, the opposite ends of said moving body passing loosely through said through openings in said end plates; and support means for supporting each end of said moving body such that said moving body can oscillate vertically therein.

The essence of the present invention is the provision of a longitudinally-extending moving body in the discharge port of the nozzle of a fountain-type soldering apparatus. The ends of the moving body pass through openings formed in end plates which form the end walls of the nozzle and are supported such that the moving body can freely oscillate in the vertical direction due to the force of the stream of molten solder passing thereover.

Numerous support means for supporting the ends of the moving body are conceivable. In accordance with one mode of the present invention, both ends of the moving body are elastically supported by tension springs, while the other ends of the tension springs are each secured to a suitable member. In another mode of the present invention, stoppers as the support means are secured to the ends of the moving body, and the ends of the moving body are supported by a suitable member such that the moving body can freely oscillate in the vertical direction.

When the moving body is performing oscillating movement, it is desirable that the widthwise position of the movable body be substantially constant. However, it is also desirable that it be possible to adjust the widthwise position in which the moving body is maintained. This is because in many cases it is desirable that the moving body be off-center with respect to the center of the stream of molten solder, the suitable distance of the moving body from the center of the stream varying in accordance with the strength of the stream, the type of printed circuit board to be soldered, and other factors.

DETAILED DESCRIPTION OF THE PREFERRED EMBODIMENTS OF THE INVENTION

Hereinbelow, a number of preferred embodiments of a fountain-type soldering apparatus in accordance with the present invention will be explained in detail while referring to the accompanying drawings.

Figure 1:
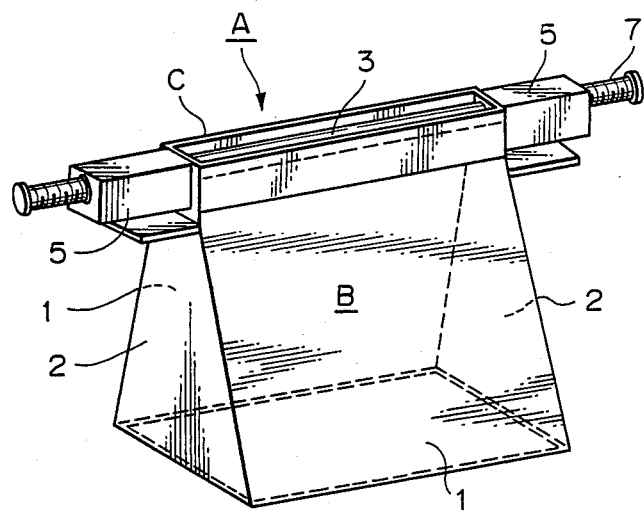
FIG. 1 is a schematic perspective view of a first embodiment of a nozzle for a fountain-type soldering apparatus in accordance with the present invention.

FIG. 1 is a schematic perspective view of a discharge nozzle which is immersed in a soldering bath. As shown in the figure, a discharge nozzle A for use in the present invention consists of a pair of side panels 1 which slope towards one another and a pair of parallel end panels 2 which are disposed at opposite ends of the side panels 1 in a confronting relationship. The side panels 1 and the end panels 2 form a roof-shaped, four-sided body B which is open at the top and bottom and which flares outwards at the lower end. The upper ends of the side panels 1 are bent vertically upwards to form a longitudinally-extending discharge port C. During operation of the nozzle A, molten solder flows through the body B from the bottom towards the top, gushes out the discharge port C, and flows to the outside of the nozzle A. The discharge nozzle A is immersed in molten solder within a large, unillustrated outer tank, and molten solder circulates between the nozzle A and the outer tank. The structure of the outer tank itself is well known to those skilled in the art, and as there are no particular restrictions on the structure thereof, it has been omitted from the drawings.

The upper ends of the side panels 1 which define the sides of the discharge port C are separated by a uniform gap, and a moving body in the form of a moving shaft 3 having a circular transverse cross section is disposed therein. The ends of the moving shaft 3 pass through suitable through opening, e.g., through holes 6 formed in the end panels 2 and extend to the outside thereof. Housings 5 which each house one end of the moving shaft 3 are installed on the outer surface of each of the end panels 2. A tension spring 4 whose tensile force can be adjusted is attached to the end of the moving shaft 3 which extends into the housing 5, and the other end of the spring 4 is connected to an adjusting screw 7. Thus, both ends of the moving shaft 3 are supported by the housings 5 through the tension springs 4.

The adjusting screws 7 are supported by the housings 5 such that by turning the adjusting screws 7, the tension of the tension springs 4 can be adjusted. Other suitable means can instead be used for supporting the outer ends of the springs 4 and adjusting the tension therein.

When performing soldering using a fountain-type soldering apparatus having the above-described structure, molten solder is caused to flow upwards through the body B of the nozzle A by an unillustrated pump. As the molten solder flows past the moving shaft 3 and exits from the discharge port C, the moving shaft 3 oscillates up and down, producing many choppy waves in the stream of molten solder which flows from the nozzle A.

Furthermore, at the time of soldering, as the size of the waves in the stream of molten solder depends on the strength of the up and down oscillations of the moving shaft 3, by adjusting the tension in the tension springs 4 which support the moving shaft 3, the size of the waves can be adjusted in accordance with the type of printed circuit board which is being soldered. During soldering, the position of the moving shaft 3 in the widthwise direction of the nozzle A should be substantially constant. By using a stopper as will be described further on, the widthwise movement of the moving shaft 3 can be made as small as possible.

Most of the molten solder exits from the discharge port C and flows to the sides of the nozzle A, but a portion flows through the above-mentioned holes 6 in the end panels 2 and flows downwards into the unillustrated solder bath. The housings 5 for the support means are constructed so that molten solder will not accumulate therein, so there is almost no possibility of molten solder contacting the springs 4. Accordingly, the deterioration of the springs 4 by solder is minimized.

The moving shaft 3 of the present invention need not be rod-shaped with a circular cross-section, and it can be plate-shaped, prismatic, or have any other suitable shape which enables it to be oscillated up and down by the stream of molten solder and enables it to impart an undullation to the stream.

Figure 3:
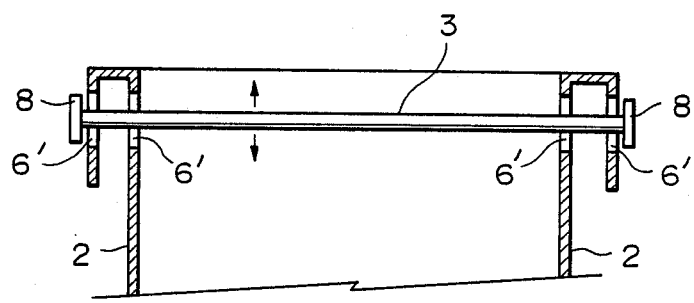
FIG. 3 is a schematic cross-sectional view of a portion of another embodiment of a nozzle for a fountain-type soldering apparatus in accordance with the present invention.

FIG. 3 illustrates another embodiment of the present invention in which a different mechanism is employed to support the ends of the moving shaft 3. As shown in the figure, through holes 6' are formed in the ends of the end panels 2 and in the end walls of housings 5 formed on the outer surfaces of the end panels 2. The moving shaft 3 passes through all of the through holes 6' and has stoppers 8 secured to both ends thereof to limit its movement in the longitudinal direction and prevent it from coming out of the nozzle A. The through holes 6' are elongated in the vertical direction so as to enable the moving shaft 3 to oscillate up and down. The stoppers 8 can be in the form of screws which are screwed into the ends of the shaft 3, the heads of the screws being larger than the width of the through holes 6' provided in the end walls of the housings 5.

As previously stated, there is no restriction on the position of the moving shaft 3 in the stream of molten solder, but in order to promote the vertical oscillations of the moving shaft 3, it is desirable that it be disposed in a portion of the stream where the flow is nonuniform. Accordingly, in another mode of the present invention, the moving shaft 3 is disposed on either side of the widthwise center of the discharge port C. By disposing the moving shaft 3 in this manner, the strength of the discharge flow differs on the front and backsides of the shaft 3, as a result of which it is also made to oscillate horizontally, and the movement of the choppy waves which are generated in the stream of molten solder becomes more complicated, which is desirable.

Figure 4:
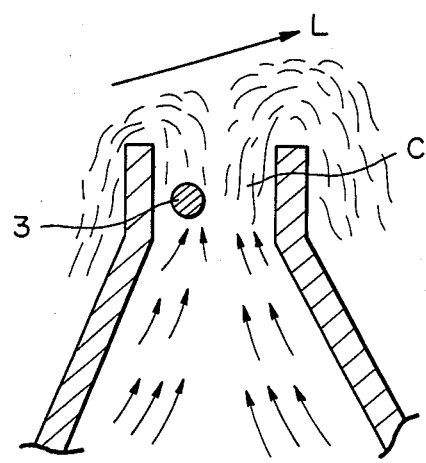
FIG. 4 is a schematic cross-sectional view of the discharge port of the nozzle of a fountain-type soldering apparatus in accordance with the present invention, showing the shape of the discharged stream of molten solder when the moving body is displaced from the centerline of the discharge port.

FIG. 4 schematically illustrates this manner of installing the moving shaft 3. In this case, it is desirable that the moving shaft 3 be disposed on the side of the center of the stream of solder which is closer to the direction from which the printed circuit board enters the stream. In the figure, the arrow L indicates the direction of movement of a printed circuit board and the centerline in the figure indicates the widthwise center of the discharge port C. If the moving shaft 3 is disposed off-center in this manner, the stream of molten solder becomes asymmetric with respect to the centerline, and the upper surface of the stream is sloped upwards in the direction of movement of the printed circuit board. By sloping the upper surface of the stream of solder in this manner, inclusions such as air bubbles adhering to the soldered surface of the printed circuit board can be easily removed.

Figure 2:
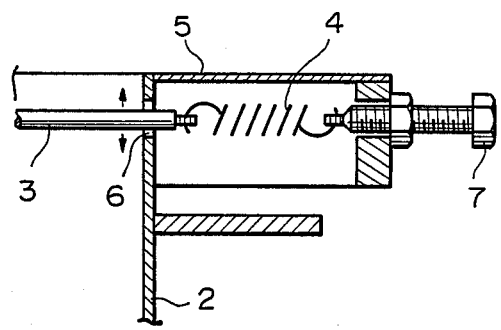
FIG. 2 is an enlarged cross-sectional view showing the structure of the moving body support mechanism of the nozzle illustrated in FIG. 1.
Figure 5:
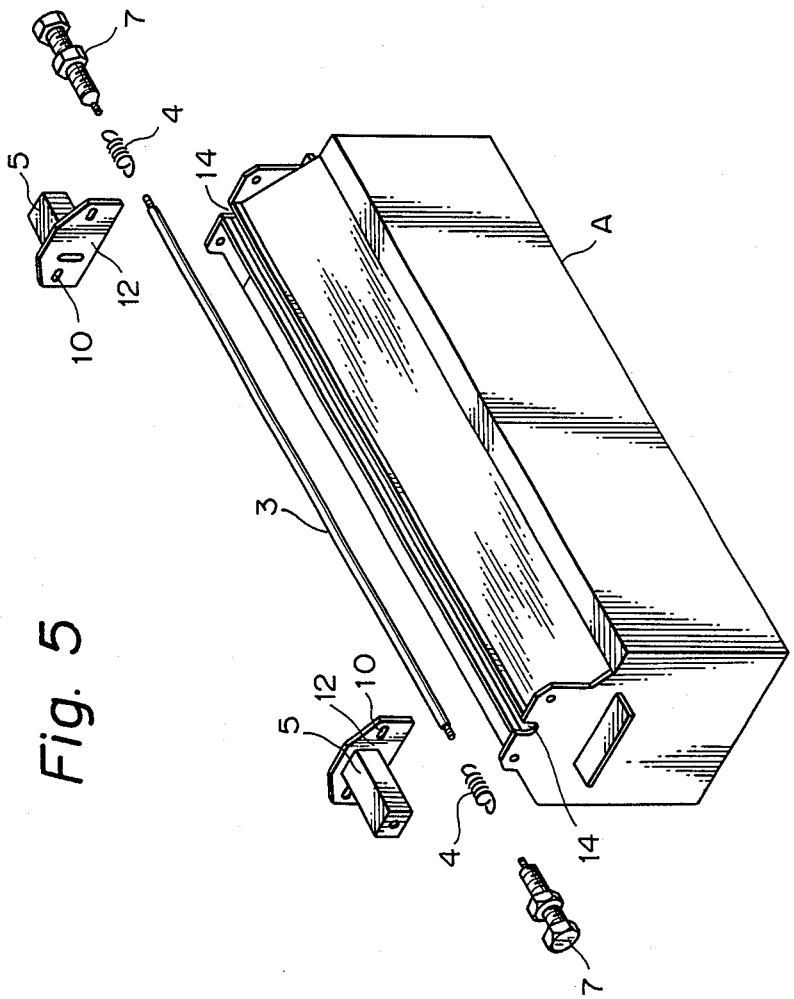
FIG. 5 is an exploded view of another embodiment of a nozzle for a fountain-type soldering apparatus in accordance with the present invention.

FIG. 5 is an exploded view of another embodiment of a nozzle A in which the distance of the moving shaft 3 from the center of the stream of solder can be adjusted by moving two housings 5 in the widthwise direction of the nozzle A. The widthwise position of the moving shaft 3 can be adjusted together with the housings 5. The housings 5 have flanges 12 formed thereon which contact the end panels 2, and each of the flanges 12 has two horizontally-elongated holes 10 formed therein. The housings 5 are secured to the end panel 2 by unillustrated screws which pass through the elongated holes 10 and screw into corresponding holes formed in the end panels 2. A through opening 14 corresponding to the through holes 6 of FIG. 2 is formed in each panel 2 for the moving shaft 3 to pass through. The width of the opening 14 is sufficient to enable the moving shaft 3 to be moved therein in the widthwise direction. In the example shown in FIG. 5, both ends of the moving shaft 3 are supported by the housings 5 through tension springs 4, although it is also possible to support the shaft 3 in the same manner as shown in FIG. 3.

In accordance with the present invention, a fountain-type soldering apparatus is obtained in which the vertical oscillations of a moving body which is disposed with a stream of molten solder produce uniform, choppy waves in the stream. Furthermore, the structure of the apparatus is extremely simple, it is not subject to breakdowns, and there is little deterioration of the support mechanism for the moving body due to molten solder. In particular, as it is not necessary to provide a separate drive mechanism for the moving body, the present invention is extremely advantageous from the standpoint of equipment costs and running costs.

In addition, when the moving body is supported by adjustable springs, the tension of the springs can be adjusted in accordance with the type of printed circuit board so as to vary the size of the waves produced in the stream of solder. Therefore, a fountain-type soldering apparatus is obtained by means of which high-quality soldering can be inexpensively performed.

Furthermore, when the moving body is disposed in a position which is displaced from the widthwise center of the discharge post, a sloped stream of solder is obtained, whereby the quality of the soldered article can be further increased.

Accordingly, by using the fountain-type soldering apparatus of the present invention, the extremely valuable advantages are obtained that the efficiency of the soldering of a printed circuit board or the like can be increased, and the quality of the soldered article can be improved.

What is claimed is:

1. A fountain-type soldering apparatus which comprises:
    an outer tank which contains molten solder;
    a nozzle which is immersed in said molten solder in said outer tank, said nozzle having a longitudinally-extending discharge port which extends above the surface of said molten solder and having two end panels at the opposite ends of said nozzle which form the end walls thereof, each of said end panels having a through opening formed therein;
    a moving body which is disposed in said discharge port and which extends for the length thereof, the opposite ends of said moving body passing loosely through said through openings in said end plates; and
    support means for supporting each end of said moving body such that said moving body can oscillate vertically therein.

2. A fountain-type soldering apparatus as claimed in claim 1, wherein said support means is:
    elastic support means for elastically supporting the ends of said moving body.

3. A fountain-type soldering apparatus as claimed in claim 2, wherein said elastic support means comprises:
    two tension springs which are disposed on the outside of said end panels, the inner end of each of said tension springs being connected to one end of said moving body, and the outer end of each of said tension springs being supported by a housing for said support means.

4. A fountain-type soldering apparatus as claimed in claim 3, wherein the outer end of each of said tension springs is supported by said housing via an adjusting screw, which is screwed into said housing in parallel with said moving body.

5. A fountain-type soldering apparatus as claimed in claim 1, wherein said support means comprises:
    two stopper members which are secured to the opposite ends of said moving body, said through openings being through holes, and said stopper members being larger than the diameter of said through holes.

6. A fountain-type soldering apparatus as claimed in claim 5, which further comprises:
    a housing for each of said support means, said moving body being disposed with passing through said housing, said through hole being provided in said housing, and said stopper being larger than the diameter of said through hole in said housing.

7. A fountain-type soldering apparatus as claimed in claim 1, wherein said moving body is disposed on either side of the widthwise center of said discharge port.

8. A fountain-type soldering apparatus as claimed in claim 7, which further comprises:
    means for adjusting the widthwise position of said moving body in said discharge port.

9. A fountain-type soldering apparatus as claimed in claim 8, which further comprises:
    a housing for said support means, said means for adjusting the widthwise position of said moving body being provided in said housing and the said moving body being adjusted in its widthwise position together with said housing.

10. A fountain-type soldering apparatus as claimed in claim 1, wherein said moving body is a rod having a circular transverse cross section.

* * * * *